Nov. 4, 1958  A. E. DRISSNER ET AL  2,859,042
CHUCK MECHANISM
Filed Oct. 13, 1954
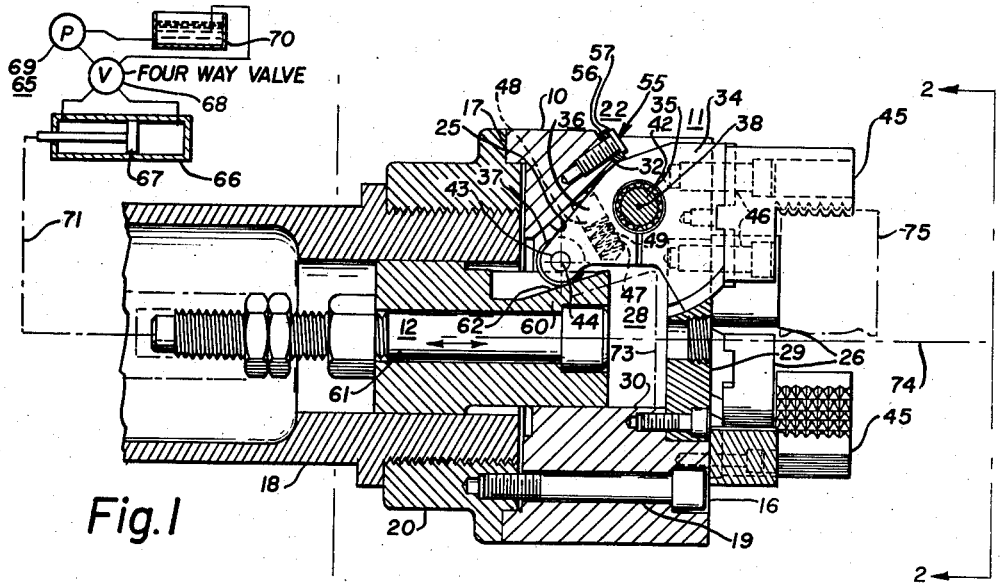
Fig. 1
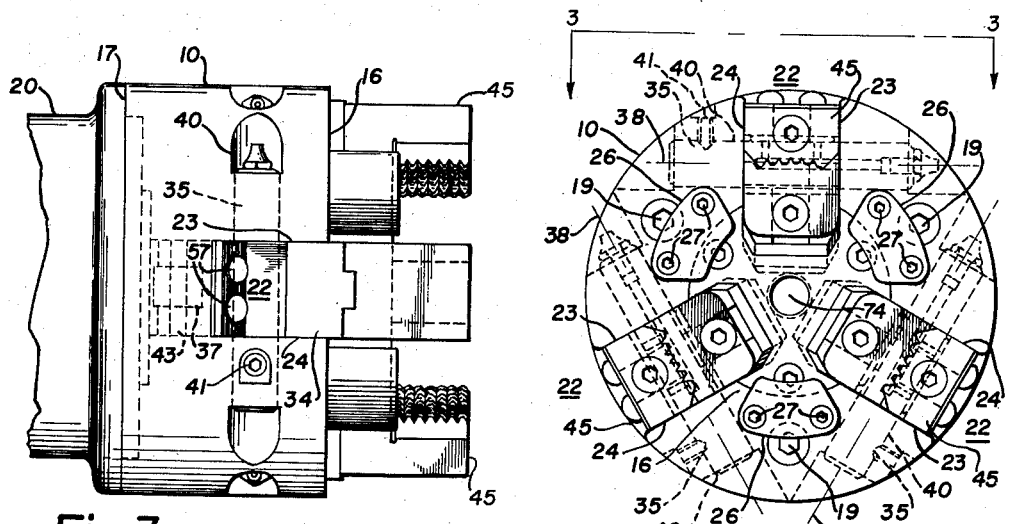
Fig. 3
Fig. 2
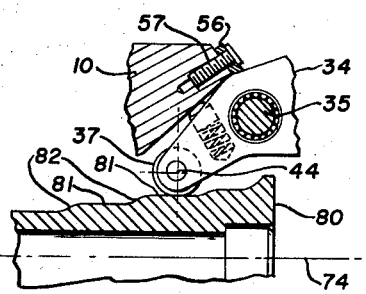
Fig. 4
INVENTORS,
ALFRED E. DRISSNER
ROBERT BEACOM
BY
Woodling + Krost
Atty's.

United States Patent Office 2,859,042
Patented Nov. 4, 1958

2,859,042
CHUCK MECHANISM

Alfred E. Drissner and Robert Beacom, Cleveland, Ohio, assignors to The National Acme Company Application October 13, 1954, Serial No. 462,032

4 Claims. (Cl. 279—108)

This invention relates in general to chucks and more particularly to frictionless chucks having a rocking, angular gripping action.

Chucks or workpiece holders have been in use for many years. These conventional chucks have jaw holders upon which jaws are adapted to be mounted and which move in a generally straight line or perpendicular movement toward the chuck axis to grip a workpiece. This movement is usually effected by means of a separate power system acting through a cam mechanism which for the sake of example might be two triangular shaped cams or a sliding dove-tail type cam arrangement. Regardless of the exact type of cam that is used, there is a great amount of friction between the sliding parts which has always been found to be quite objectionable.

The jaw holders are mounted in what might be referred to as slots or T-slots in the chuck body for bearing movement. Therefore, because conventional chuck jaws overhang the chuck body for gripping a workpiece, the cantilever effect of the jaws tends to tip the jaw holders in the slots and create an enormous friction, thus causing a loss in gripping power.

Stops are mounted upon the face of these chucks in an attempt to maintain workpieces at a predetermined axial position. In actual practice, as soon as the jaws engage the workpiece, the above-mentioned tipping action takes place and the jaws actually move the workpiece away from the stops. Since in conventional chucks, as successive workpieces are gripped, the distance which each is moved away from the stops by this tipping action may vary, it is difficult to machine the successive workpieces to the close tolerances that are required.

An object of the invention is to provide a chuck with a more powerful gripping action.

Another object of the invention is the provision of roller means to eliminate friction in a chuck.

Another object of the invention is to provide a chuck which eliminates the conventional jaw slide mechanism and therefore adds the power conventionally lost in friction to the actual gripping power of the chuck.

Another object of the invention is to provide a chuck whose jaws travel through a rocking, angular motion to grip a workpiece rather than through a straight line motion.

Another object of the invention is to provide a stop means upon a chuck whereby the position of a workpiece in the chuck is positively predetermined.

Another object of the invention is to provide a chuck whereby less power is required from a power source to provide the same gripping action upon a workpiece to be held by the chuck.

Another object of the invention is to provide a chuck with wiper means and closely fitting parts whereby loose particles are prevented from entering the interior of a chuck.

Other objects and a fuller understanding of this invention may be had by referring to the following description and claims, taken in conjunction with the accompanying drawing, in which:

Figure 1 is a side view partially in section embodying the features of the invention, and diagrammatically showing an actuating hydraulic circuit;

Figure 2 is a front view taken generally along the lines 2—2 of Figure 1;

Figure 3 is a top view taken generally along the lines 3—3 of Figure 2; and

Figure 4 is a fragmentary view showing principally a different camming mechanism as taught by the invention.

The chuck or workpiece holder which is illustrated in the drawings comprises generally a chuck body or housing 10 and a rocker arm assembly shown generally at 11. The rocker arm assembly 11 is adapted to cooperate with a cam slide assembly which is illustrated generally by the reference numeral 12.

Although only one rocker arm assembly is described in the forthcoming description, three such assemblies have been used to explain the operation of this invention; and it will be readily apparent that any number of rocker arm assemblies may be adapted to this particular invention.

The chuck body or housing 10 comprises generally a front face surface 16 and a rear face surface 17. The rear face surface 17 is adapted to be attached to a rotating mechanism or spindle 18 by suitable means such as bolts 19 and a threaded adaptor ring 20, in cases where it is desired that the workpiece holder be rotated. The chuck body has a radially inwardly extending depression or slot indicated generally at 22, which depression has first and second substantially parallel side walls defining the depression and which are indicated by the reference numerals 23 and 24, respectively. The depression 22 is provided with a downwardly extending third wall indicated by the reference numeral 25. Stop means 26 are adapted to be secured upon the front face surface 16 of the chuck body 10 by suitable means such as bolts 27. The chuck body 10 is so constructed as to produce an interior cavity or portion indicated generally by the reference numeral 28 which is covered by a dust cap 29 which prevents dust and chips from entering this interior 28. The interior cavity or portion 28 is defined and enclosed by a walled surface indicated by the reference numeral 30.

The rocker arm assembly 11 comprises generally a rocker arm 34, a pivot pin or member 35, spring means 36 and rollable cam follower or bearing means 37. The pivot member 35 has an axis 38 and is mounted upon the chuck body 10 by insertion through holes 40 which are provided in the chuck body 10. The pivot member 35 is secured from movement by means of a cone point set screw 41. The rocker arm 34 is mounted upon suitable bearings 42 for rotation about said pivot member 35. An axle member 43 having an axis 44, is mounted upon said rocker arm 34 and the rollable bearing means 37 is suitably mounted for rotation thereon. A suitable gripping jaw 45 may be attached to the face of the rocker arm assembly 11 by suitable means such as by bolts 46. As requirements change, the size and shape of the jaw may be changed accordingly. The spring means 36 which include a spring 47 and a pin 48 are contained within a recess 49 which is provided within the rocker arm 34. The pin 48 bears upon the third wall 25 of the depression 22 whereby a force is exerted upon said rocker arm 34 and tends to rotate it about the pivot member 35 in a counterclockwise direction, as viewed in Figure 1. The rocker arm 34 and the depression 22 are so constructed that upon rotation of said rocker arm about the pivot member 35, a surface 32 on the rocker arm travels in close proximity to the third wall 25 of the depression 22 whereby a very close tolerance is effected. This is highly desirable since any metal turnings, dust and the like should be prevented from entering the interior portion 28 of the chuck body 10. In addition to this close tolerance that is effected between the rocker arm 34 and the third wall 25, wiper means 55 are provided which include a wiper blade 56 mounted upon the chuck body 10 by suitable means such as the screws 57 and constructed out of any suitable material such as felt or a rubberlike substance whereby one portion of the wiper blade 56 engages the surface 32 of the rocker arm 34. This prevents foreign material from entering the interior of the chuck. The close tolerance between the rocker arm 34 and the side walls 23 and 24 of the depression 22 also maintains the chuck cavity free of loose material.

The cam slide assembly 12 comprises generally a wedge type cam member 60 mounted about a draw rod 61 and located within the interior portion 28 of the chuck body 10. The cam slide assembly 12 is adapted for movement in first and second longitudinal or straight line directions indicated by the double headed arrow in Figure 1. The wedge type cam member 60 has a camming surface 62 adapted to engage and cooperate with the rollable bearing means 37 upon movement of said cam slide assembly in either of said first and second directions. A hydraulic power system or source indicated generally by the reference numeral 65 comprises generally a cylinder 66 having a piston 67, a valve 68 shown as a four-way valve, a pump 69 and a sump 70. The four-way valve 68 is provided to direct the flow of hydraulic fluid between the pump 69, the right and left ends of the cylinder 66, and the sump 70. Any suitable linkage or attaching means, shown by way of a dotted line 71, may be used to connect the piston 67 and the draw rod 61 whereby movement of the piston 67 is communicated to the cam slide assembly 12.

Although only one rocker arm assembly 11 has been discussed thus far for the sake of brevity in describing the invention, the operation of the invention will be more fully understood if three assemblies are described as cooperating together.

The rocker arm assemblies 11 are spaced substantially equidistantly from the axis of the chuck which axis is illustrated as a dot-dash line 74 in Figure 1 and as a point 74 in Figure 2. Movement of the rocker arm assemblies 11 may be said to be a relative movement either toward or away from the axis 74. As shown partially in Figure 1, a workpiece 75 is adapted to be gripped or held by the gripping jaws 45 upon movement of the rocker arms 34 in a downward and inward direction toward the axis 74.

The operation of the invention will be described starting with the jaws in an open or released position; and with the jaws in this position, the cam slide assembly will be to the extreme right as shown by the dotted lines 73 in Figure 1.

The workpiece 75 to be gripped is placed between the gripping jaws 45, and the four-way valve 68 of the hydraulic system 65 is actuated whereby hydraulic fluid is forced into the right end of the hydraulic cylinder 66 and the piston 67 is forced to the left. Movement of the piston 67 to the left as viewed in Figure 1 causes movement of the draw rod 61 and hence movement of the cam member 60 to the left. As the cam member 60 moves to the left, the cam surfaces 62 engages the rollable bearing means 37 whereby the rocker arms 34 and hence the gripping jaws 45 travel in a rocking movement or in a clockwise rotational direction about the pivot member 35 and downwardly and inwardly toward the axis 74 and hence grip the workpiece 75. As shown in Figure 1, engagement of the workpiece 75 has just been effected and the downward and inward movement of the jaws 45 forces the workpiece positively against the stop means 26. When release of the workpiece 75 is desired, the four-way valve 68 is actuated in the reverse manner of that just described and therefore hydraulic fluid is forced into the left end of the hydraulic cylinder 66 and as a result the draw rod 61 and hence the cam member 60 is forced to the right. This causes a decrease in pressure between the cam surface 62 and the rollable bearing means 37 and hence causes the release of the gripping pressure exerted through the rocker arms 34 to the gripping jaws 45 which hold the workpiece 75. Disengagement of the workpiece 75 and the jaws 45 is completed by the force exerted by the spring 47 against the pin 48 which pin in turn is in engagement with the third wall of the depression 22. This engagement causes the rocker arm 34 as viewed in Figure 1 to travel in a counterclockwise direction; and hence release of the workpiece 75 is completely effected.

Figure 4 shows a fragmentary view of a modified cam member 80 which may be used in the chuck of Figures 1 to 3. As seen in Figure 4, the cam member 80 is provided with a series of steps or surfaces 81 and a series of interconnecting surfaces 82. These stepped surfaces 81 each include a line along the direction of movement of the cam member 80, substantially equidistant from the axis 74. The prime purpose of these steps 81 is to provide a locking action between the cam means and the rollable means when the rollable means is in contact with a step and hence prevent a release of the workpiece 75 upon failure of the hydraulic power system 65.

The possibility of injury to someone, such as a workman, as a result of the workpiece flying away from the chuck mechanism is therefore obviated. Movement of the rocker arms and hence the jaws with this type of cam is effected by travel of the rollable bearing means from one of the stepped surfaces 81 to another by way of the interconnecting surfaces 82.

When the workpiece 75 is gripped by the chuck jaws as shown in Figure 1, the rocker arm 34 tends to pull the workpiece downwardly and inwardly toward the front face 16 of the chuck body 10. In order that the workpiece 75 be maintained in a fixed axial position so that it may be machined to the correct thickness, the stop means 26 are provided upon the face of the chuck. Since the movement of the chuck jaws is in a downwardly and inwardly extending direction, the workpiece 75 will be pulled positively against the stop means 26 therefore insuring the position of the workpiece during machining or other type of operation. It will thus be seen that since successive workpieces are held in exactly the same position, they may be machined or otherwise worked to very close tolerances.

Also, since the movement of the rocker arm in this invention is in an angular direction, the tipping action resulting from the cantilever effect of the overhanging jaws of conventional type chucks is avoided and hence the enormous friction from this type of action is circumvented. As a result, a more powerful gripping return is obtained.

Additional friction is dispensed with in the use of the rollable cam follower of this invention which cooperates with the cam. With this feature, the power lost from the sliding parts of conventional camming mechanisms is avoided and this results in a greater gripping action from the same power source.

Although this invention has been described as illustrating a three-jaw chuck, it will be readily apparent that a lesser or greater number of jaws may be utilized to embody the invention as herein taught and disclosed. The invention has been illustrated as a gripping unit whereby the outermost surfaces of a workpiece are gripped in a downwardly and inwardly extending motion, but it will be readily apparent that if it be desired to grip a workpiece from the inside out, for example a hollow workpiece, the only change from that construction which is shown in Figure 1, would be that of moving the rocker arm assembly and the cam surface to a position in the chuck which is on the opposite side of the axis 74. Therefore, movements of the cam slide assembly would cause the rocker arm to travel in an upward and inward movement and a jaw mounted on the rocker arm would be capable of gripping a workpiece from the inside out.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a rotary chuck having a central axis and comprising, a generally cylindrically shaped housing, said housing having a front face and a central interior portion, said housing having a plurality of axially parallel and circumferentially spaced slots extending from said front face to said central interior portion, each of said slots including a pivot member having an axis and mounted therein and extending transversely of said slot, a rocker arm residing in each of said slots and mounted on said pivot member for arcuate movement thereabout, each said rocker arm having a cam follower end and a gripping jaw mounting end, said cam follower end extending into said interior portion and said jaw mounting end extending to said face of said housing, said cam follower end of each of said rocker arms having a roller cam follower thereon, a cam member slidably mounted within said interior portion and adapted for axial movement in first and second directions alternatively to apply a force on said rocker arms tending to move said rocker arms in a first arcuate direction and to release said force on each of said rocker arms thereby allowing said rocker arms to be moved in a second arcuate direction, said cam member having a cam surface for each said roller cam follower, each said cam surface including a plurality of flat surface areas substantially parallel to said axis of said chuck and each spaced a different distance from said axis, each said flat surface areas connected by an interconnecting surface area, a recess within each said rocker arm, spring means carried by each of said rocker arms tending to move said rocker arms in said second arcuate direction, each said spring means comprising a pin residing within said recess and engageable with a portion of said housing adjacent said rocker arm, and a spring urging said pin into engagement with said portion of said housing, a gripping jaw having gripping jaw teeth and mounted on said jaw mounting end of each of said rocker arms, stop means mounted on said face of said housing, said stop means including a member having an outer surface adapted to engage a workpiece and limit the axial movement thereof, said axis of said pivot member being spaced from the axis of said chuck not less than the distance between the gripping jaw teeth and the axis of said chuck when the gripping jaw teeth engage the workpiece, means for moving said cam in said first direction whereby said roller cam followers move away from the axis of said chuck and travel on one of said plurality of flat surface areas to another one thereof by way of said interconnecting surface areas to arcuately move said gripping jaws toward the axis of said chuck to cause said jaws to grip the workpiece whereby substantially all of the component of the gripping force is perpendicular to the axis of said chuck and a smaller component of the gripping force is parallel to the axis of said chuck tending to pull the workpiece securely against said stop means, and means for moving said cam in said second direction whereby the force exerted on said gripping jaws is released and said rocker arms are caused to move in said second arcuate direction by said spring means to positively release the gripping jaws from the workpiece and provide clearance for inserting a new workpiece to be gripped.

2. In a rotary chuck having a central axis and comprising, a generally cylindrically shaped housing, said housing having a front face and a central interior portion, said housing having a plurality of axially parallel and circumferentially spaced slots extending from said front face to said central interior portion, each of said slots including a pivot member having an axis and mounted therein and extending transversely of said slot, a rocker arm residing in each of said slots and mounted on said pivot member for arcuate movement thereabout, each said rocker arm having a cam follower end and a gripping jaw mounting end, said cam follower end extending into said interior portion and said jaw mounting end extending to said face of said housing, said cam follower end of each of said rocker arms having a roller cam follower thereon, a cam member slidably mounted within said interior portion and adapted for axial movement in first and second directions alternatively to apply a force on said rocker arms tending to move said rocker arms in a first arcuate direction and to release said force on each of said rocker arms thereby allowing said rocker arms to be moved in a second arcuate direction, said cam member having an inclined cam surface for each said roller cam follower, a recess within each said rocker arm, spring means carried by each of said rocker arms tending to move said rocker arms in said second arcuate direction, each said spring means comprising a pin residing within said recess and engageable with a portion of said housing adjacent said rocker arm, and a spring urging said pin into engagement with said portion of said housing, a gripping jaw having gripping jaw teeth and mounted on said jaw mounting end of each of said rocker arms, stop means mounted on said face of said housing, said stop means including a member having an outer surface adapted to engage a workpiece and limit the axial movement thereof, said axis of said pivot member being spaced from the axis of said chuck not less than the distance between the gripping jaw teeth and the axis of said chuck when the gripping jaw teeth engage the workpiece, means for moving said cam in said first direction whereby said roller cam followers move away from the axis of said chuck and travel on said inclined cam surfaces to arcuately move said gripping jaws toward the axis of said chuck to cause said jaws to grip the workpiece whereby substantially all of the component of the gripping force is perpendicular to the axis of said chuck and a smaller component of the gripping force is parallel to the axis of said chuck tending to pull the workpiece securely against said stop means, and means for moving said cam in said second direction whereby the force exerted on said gripping jaws is released and said rocker arms are caused to move in said second arcuate direction by said spring means to positively release the workpiece and provide clearance for inserting a new workpiece to be gripped.

3. In a chuck having an axis and comprising, a housing, said housing having a front face and an interior portion, said housing having wall means forming a plurality of circumferentially spaced slots extending from said front face to said interior portion, each of said slots including pivot means therein and extending transversely of said slot, a rocker arm residing in each of said slots and mounted by said pivot means for arcuate movement thereabout, each said rocker arm having a cam follower end and a gripping jaw mounting end, each of said rocker arms including a curved surface thereon adapted to move during operation of said chuck closely adjacent said wall means of said slots, means extending between said housing and said curved surface of said rocker arms for preventing foreign material from entering said interior portion, said cam follower end extending into said interior portion and said jaw mounting end extending to said face of said housing, a cam member slidably mounted within said interior portion and adapted for axial movement in first and second directions alternatively to apply a force on said rocker arms tending to move said rocker arms in a first arcuate direction and to release said force on each of said rocker arms thereby allowing said rocker arms to be moved in a second arcuate direction, said cam member having an inclined cam surface for each said cam follower, spring means cooperating between said wall means of said slots and said rocker arms tending to move said rocker arms in said second arcuate direction, a gripping jaw having gripping jaw teeth and mounted on said jaw mounting end of each of said rocker arms, stop means mounted on said face of said housing, said stop means including a member having an outer surface adapted to engage a workpiece and limit the axial movement thereof, said pivot means being spaced from the axis of said chuck not less than the distance between the gripping jaw teeth and the axis of said chuck when the gripping jaw teeth engage the workpiece, means for moving said cam in said first direction whereby said cam followers move away from the axis of said chuck and travel on said inclined cam surfaces to arcuately move said gripping jaws toward the axis of said chuck to cause said jaws to grip the workpiece whereby substantially all of the component of the gripping force is perpendicular to the axis of said chuck and a smaller component of the gripping force is parallel to the axis of said chuck tending to pull the workpiece securely against said stop means, and means for moving said cam in said second direction whereby the force exerted on said gripping jaws is released and said rocker arms are caused to move in said second arcuate direction by said spring means to positively release the workpiece and provide clearance for inserting a new workpiece to be gripped.

4. In a chuck having an axis and comprising, a housing, said housing having a front face and an interior portion, said housing having wall means forming a plurality of circumferentially spaced slots extending from said front face to said interior portion, each of said slots including pivot means therein and extending transversely of said slot, a rocker arm residing in each of said slots and mounted by said pivot means for arcuate movement thereabout, each said rocker arm having a cam follower end and a gripping jaw mounting end, each of said rocker arms including a curved surface thereon adapted to move during operation of said chuck closely adjacent said wall means of said slots, means extending between said housing and said curved surface of said rocker arms for preventing foreign material from entering said interior portion, said cam follower end extending into said interior portion and said jaw mounting end extending to said face of said housing, a cam member slidably mounted within said interior portion and adapted for axial movement in first and second directions alternatively to apply a force on said rocker arms tending to move said rocker arms in a first arcuate direction and to release said force on each of said rocker arms thereby allowing said rocker arms to be moved in a second arcuate direction, said cam member having an inclined cam surface for each said cam follower, spring means cooperating between said wall means of said slots and said rocker arms tending to move said rocker arms in said second arcuate direction, a gripping jaw having gripping jaw teeth and mounted on said jaw mounting end of each of said rocker arms, said pivot means being spaced from the axis of said chuck not less than the distance between the gripping jaw teeth and the axis of said chuck when the gripping jaw teeth engage the workpiece, means for moving said cam in said first direction whereby said cam followers move away from the axis of said chuck and travel on said inclined cam surfaces to arcuately move said gripping jaws toward the axis of said chuck to cause said jaws to grip the workpiece whereby substantially all of the component of the gripping force is perpendicular to the axis of said chuck and a smaller component of the gripping force is parallel to the axis of said chuck tending to pull the workpiece against said front face of said chuck, and means for moving said cam in said second direction whereby the force exerted on said gripping jaws is released and said rocker arms are caused to move in said second arcuate direction by said spring means to positively release the workpiece and provide clearance for inserting a new workpiece to be gripped.

References Cited in the file of this patent
UNITED STATES PATENTS

| | | |
|---|---|---|
| 393,093 | Bignall | Nov. 20, 1888 |
| 807,876 | Slivinski | Dec. 19, 1905 |
| 1,194,817 | Carpenter | Aug. 15, 1916 |
| 2,375,115 | Kylin | May 1, 1945 |
| 2,573,166 | Sundt | Oct. 30, 1951 |
| 2,573,403 | Church | Oct. 30, 1951 |
| 2,613,943 | Trudeau | Oct. 14, 1952 |

OTHER REFERENCES
American Machinist, Sept. 10, 1903, page 1309.